United States Patent Office 3,565,935
Patented Feb. 23, 1971

3,565,935
METHOD OF FORMING MERCAPTOALKYL SUBSTITUTED ORGANOSILICON COMPOUNDS
Abe Berger, Schenectady, N.Y., assignor to General Electric Company, a corporation of New York
No Drawing. Filed Jan. 6, 1969, Ser. No. 796,633
Int. Cl. C07f 7/02, 7/04
U.S. Cl. 260—448.2          8 Claims

ABSTRACT OF THE DISCLOSURE

Monomeric organosilicon compounds, having mercaptoalkyl substituents, are formed through treatment of an organosilicon compound, having an alkyl substituent with a thioacid salt group, with ammoia or an amine compound. The remaining groups on the organosilicon compound are not affected by the treatment and retain functional or nonfunctional substituents, unchanged.

BACKGROUND OF THE INVENTION

Related applications

This application is related to application Ser. No. 789,401, Ser. No. 789,418, and Ser. No. 789,396, all by Abe Berger, filed of even date herewith, and assigned to the same assignee as the present invention.

Prior art

Numerous methods have been proposed in the prior art for preparing mercaptoalkyl substituted silanes. For example, German Pat. No. 1,163,818 describes the reaction of a haloalkyl substituted silane with thiourea in ethanol, followed by the decomposition of the isothiouronium salt with ammonia to form the mercaptoalkyl substituent. This process is, however, subject to some difficulties because of the unavailability of the starting materials and the low yields which can be expected. Further, certain reactive, functional groups cannot be retained on the silicon atom during the processing and dimercapto substitution on one alkyl group cannot be obtained.

Other processes utilize the anti-Markownikoff addition of hydrogen sulfide to olefinic silanes. However, the mercaptoalkyl group formed according to this reaction can compete for additional olefinic silanes during the reaction and an excess of hydrogen sulfide, in liquid form, must be employed to prevent the competing reaction. The difficulty of handling and storing this excess reactant material is, of course, obvious.

Of course, various other methods are known to the art but, in general, each requires the use of relatively expensive reaction components, or is carried out under such conditions that the formation of a mercaptoalkyl substituted silane with other functional substituents is not possible. Further, it is extremely difficult, by most of these prior art reactions, to form monomeric organosilicon compounds having two mercaptoalkyl substituents and, in general, impossible to form organosilicon compounds wherein one alkyl group is substituted with two mercaptan groups.

SUMMARY OF THE INVENTION

In accordance with the present invention, a method has been developed for forming mercaptoalkyl substituted silanes having other functional substituents through processes which give a very high yield. In this process, a thioacid salt is formed on the alkyl substituent of a monomeric organosilicon compound and, through treatment with particular amines or ammonia, the thioacid group is converted to a mercaptan group.

The process can best be illustrated by the following generic reactions, wherein Equation 1 represents the reaction of an alkyl group having a single thioacid substituent with ammonia or particular amines, while the reaction illustrated by Equation 2 illustrates a similar reaction for the conversion of two thioacid groups on a single alkyl substituent to mercaptan groups:

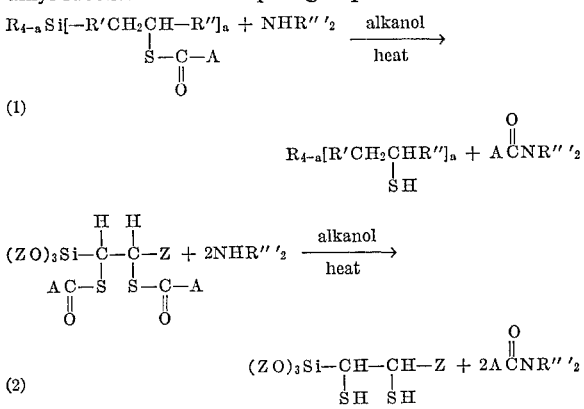

where each R is an organic group of not more than 18 carbon atoms and is individually selected from the class consisting of alkyl, aryl, aralkyl, and alkaryl groups, phenoxy, lower ($C_1$–$C_6$) alkoxy, amine, and aminoxy groups; R' is a divalent, saturated alkylene group, R'' is a monovalent, saturated alkyl group or hydrogen, the total number of carbon atoms in R' and R'', combined being from 0 to 20; R''' is selected from the class consisting of lower ($C_1$–$C_6$) alkyl groups and phenyl, and is preferably an alkyl group of from 1 to 3 carbon atoms; A and Z are each hydrocarbon groups of up to 15 carbon atoms, and is preferably an alkyl group of from 1 to 3 carbon atoms, and $a$ is from 1 to 2.

The organosilicon compound employed in the reaction represented by Equation 1 having an alkyl substituent with a thioacid salt group, is prepared by reacting an olefinically substituted silicon group with a thioacid in the presence of a free radical catalyst. The dithioacid salt substituted alkyl group, attached to the silicon atom employed in the reaction according to Equation 2 is obtained by first treating a chlorosilane with an alkynyl metal, and treating the resulting product with a thioacid in the presence of a free radical catalyst.

Treatment of organosilicon compounds having the thioacid salt substituted alkyl group with the amine or ammonia is accomplished in a solvent selected from the class consisting of alcohol, hydrocarbons, and ethers, at the reflux temperature of the solution. The reaction product can be recovered from the solution by distilling off the solvent, filtering the product from the amide which precipitates, and then fractionating the product in order to purify it.

DESCRIPTION OF THE PREFERRED EMBODIMENTS

Referring first to the reaction according to Equation 1 the organosilicon substituted with the alkyl group having a thioacid salt, employed as one of the reactants according to Equation 1 can be formed by the reaction:

(3)
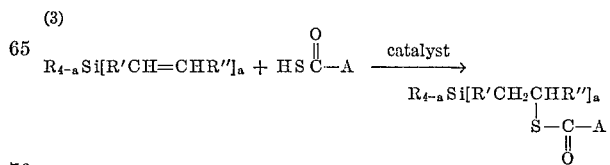

where R, R', R'', A, and $a$ are as previously defined. The reaction is carried out in the absence of a solvent, employing only the reagents indicated. The catalysts can be any of the standard free radical catalysts and the reaction can be run at various temperatures from room temperature to 130° C.

The alkenyl silanes, themselves, are readily available by various routes. For example, they can be formed by the thermal condensation reaction of vinylic halides with silicon hydride. Similarly, they can be formed by the addition of silicon hydrides to alpha-omega diolefins, or other diolefins. Such processes are well known in the art.

The reactants are employed in a stoichiometric ratio, though a 10% excess of either of the reactants is permissible. As noted, any of the free radical catalysts known in the art can be employed, such as, heat, ultraviolet light, peroxides, or a azo catalyst, such as, azobisisobutyronitrile. When a free radical catalyst, other than the heat or ultraviolet light, is employed, the amounts are generally those catalytic amounts previously employed in the art.

The order of addition of the reactants is not critical. It is preferable, however, to add the thioacid to the olefinically substituted organosilicon compound. This is to avoid any tendency toward side reactions. The time of addition is immaterial and the two reactants can be mixed together as quickly as desired. The reaction requires approximately 4 to 5 hours or more, at room temperature, employing ultraviolet light. With higher temperatures, and other catalysts, the reaction can proceed more quickly. If it is desired to purify the product, the purification can be accomplished by vacuum distillation.

Among the hydrocarbon radicals represented by R are alkyl radicals, such as, methyl, ethyl, propyl, butyl, octyl, dodecyl, isopropyl, isobutyl, etc.; cycloalkyl radicals, such as, cyclohexyl, cyclopentyl, cycloheptyl, etc.; aryl radicals, such as, phenyl, bisphenyl, naphthyl, benzoylphenyl, paraphenoxyphenyl, tolyl, xylyl, etc.; aralkyl radicals, such as, benzyl, phenethyl, etc. Similar hydrocarbon radicals are represented by A, while the monovalent radicals represented by R'' and the lower alkyl radicals of Z include methyl, ethyl, propyl, butyl, etc.

The organosilicon reactant employed in Equation 2 is formed by first reacting a trialkoxy chlorosilane with an alkynyl metal according to the reaction:

(4) $(ZO)_3SiCl + MC \equiv C-Z \rightarrow (ZO)_3SiC \equiv C-Z + MCl$ where Z is as previously defined and M is selected from the class consisting of lithium, sodium, potassium, and XMg where X is a halide selected from the class consisting of chloride, bromide, and iodide. The alkynyl silane formed according to Equation 4 is then treated with a thioacid to produce the thioacid salt substituted alkyl radical according to the reaction:

(5)

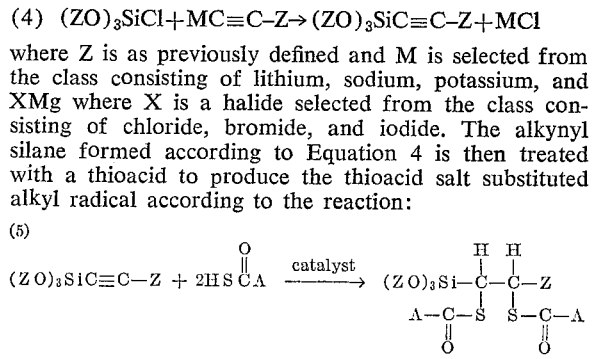

where A and Z are as previously defined.

The reaction between the alkoxy silane according to Equation 4 is a standard one involving a halogenated compound and an organometallic compound where the metal halide is formed through the reaction. The trihydrocarbonoxy alkynyl silanes are also available by other routes.

The reaction represented by Equation 5 is catalyzed by free radical catalysts in the same manner as described for the reaction of Equation 3. The catalysts and the conditions are essentially the same.

In the reactions according to either of Equations 1 or 2, essentially stoichiometric quantities of the reactants are employed. A 5% excess of ammonia or the amine can be used. When ammonia is the reactant, the reaction is preferably run under pressure in order to avoid loss of ammonia. However, reaction under atmospheric conditions, as employing ammonia bubbling through the reaction mixture, can also be accomplished, but additional ammonia must then be supplied to replace that which is lost to the atmosphere.

The reaction is carried out in a solvent, such as an alcohol, hydrocarbon, ether, or mixture of such materials. Sufficient solvent is employed to solubilize the particular organosilicon compound to be reacted. If the organosilicon compound is substituted with an alkoxy group, then the alkanol used should correspond to this alkoxy group. The solvent is also selected in order to retain the particular amide, which is formed, in solution during the course of the reaction. The order of addition of the reactants is not critical and may be dictated by the condition of the raw materials. It is preferable to add the amines or ammonia to a solution of the organosilicon compound. These solvents can be, for example, ethanol, propanol, hexane, heptane, or tetrahydrofuran.

The reaction is carried out at the reflux temperature of the reaction solution, about 80° C. for many of the reactants and solvents. In general, the reflux temperature is within the range of from 50° to 125° C. The reaction requires approximately 5 to 10 hours to complete.

The product is recovered from the reaction mixture by first stripping solvent until the amide solidifies. The reaction mixture is then cooled and the precipitated amide filtered from it. Solvent stripping, cooling, and filtration continues until there is essentially no further precipitation of amide. The remaining reaction mixture is then fractionated to recover the reaction product.

To better enable an understanding of the present invention, the following examples are given as illustrations. These should not be considered as limiting in any way the full scope of the invention as covered in the appended claims. All parts in the following examples are by weight.

EXAMPLE 1

A reaction vessel is equipped with an addition vessel, a stirrer, thermometer, condenser, and means for providing a nitrogen atmosphere. A quantity of 63 parts of diallymethylsilane was placed in the reaction vessel, under a nitrogen atmosphere, and heated to 50° C. Upon reaching this temperature, a quantity of 76 parts of purified thioacetic acid was added, dropwise, from the addition vessel. The resulting reaction was exothermic and cooling means, surrounding the reaction vessel, were employed to hold the temperature at from 80° to 90° C. After the addition of thioacetic acid was completed, the reaction mixture was kept at 90° C. for approximately from 1 to 2 hours. The mixture was then fractionated, yielding the product in an 80% yield at a boiling point of 173° C. at 20 mm. pressure. A vapor phase chromatograph analysis indicated 99% purity of a product consistent with the structure:

(6) 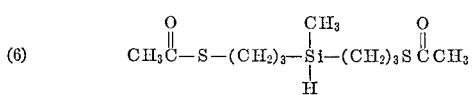

EXAMPLE 2

A reaction vessel was equipped with an ammonia source and a condenser. A quantity of 50 parts of the bis-thioester of Formula 6 was placed into the reaction mixture in solution with 120 parts of ethanol. The reaction mixture was slowly brought to reflux temperature and, simultaneously, ammonia gas was introduced into the vessel. After 8 hours of heating at reflux, with continuous ammonia addition, a white solid appeared in the reaction mixture. A portion of this white solid was removed and identified as acetamide by melting point, mixed melting point with an authentic sample, and an infrared scan. The reaction mixture was then cooled and filtered to remove the acetamide precipitate which had formed and a portion of the solvent was then distilled off, resulting in a slight additional amount of acetamide. This reaction mixture was cooled and, when an additional solvent distillation indicated a substantial absence of acetamide, the remaining mixture was fractionated. The product was collected at 118° C. and 1 mm. pressure with a purity, by vapor phase chromatography, of greater than 99%. An infrared scan showing mercaptan absorption at 3.9 microns, and the absence of the 6 micron carbonyl absorption was consistent with the structure:

(7) 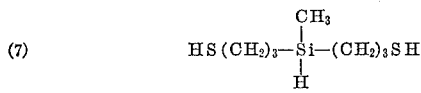

The structure of the product was further confirmed by an elemental analysis which showed 14.58% silicon, 43.56% carbon, 8.47% hydrogen, and 33.50% sulfur, comparing well with the theoretical percentages of 14.43% silicon, 43.29% carbon, 9.26% hydrogen, and 32.99% sulfur.

EXAMPLE 3

Into a reaction vessel were placed 270 parts of a 60% mixture of vinyl triethoxysilane and 40% ethynyltriethoxysilane and 152 parts of purified thioacetic acid. This mixture was irradiated with ultraviolet light for a period of 24 hours at 25° C. The mixture was fractionated and the portion boiling at from 100 to 150° C. and 2.5 mm. pressure collected. This product was refractionated and a product collected at 113–114° C. and 0.5 mm. pressure in a yield of 65% which, by vapor phase chromatography, was 99% pure. An infrared scan was consistent with the structure:

(8) 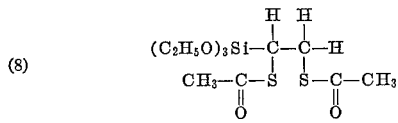

The structure of this product was further confirmed by a nuclear magnetic resonance analysis which showed the 1,2-diadduct formed.

EXAMPLE 4

A quantity of 15 parts of the product of Formula 8 was placed in a reaction vessel along with 120 parts of ethanol and the solution was heated to 75° C. A stream of anhydrous ammonia was passed into the reaction vessel for about 6 hours. At that time a vapor phase chromatography scan showed an absence of the starting material and about two-thirds of the ethanol present in the reaction mixture was then stripped in a flash evaporator. Acetamide began to precipitate from the solution and the reaction mixture was cooled, filtered, and then again stripped. A pasty mixture resulted following removal of most of the ethanol and this mixture was cooled, filtered, and then fractionally distilled. A clear liquid was collected at 82° C. and 10 mm. pressure in a yield of approximately 53%. Product purity was shown, by vapor phase chromatography, as approximately 98%. An infrared scan of the product, including a mercaptan absorption of 3.8 microns and an ethoxy absorpiton at 9.3–9.5 microns and 10.45 microns, was consistent with the structure:

(9) 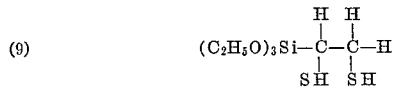

The structure of the product was further confirmed by nuclear magnetic resonance.

EXAMPLE 5

A quantity of 303 parts of the organosilicon compound:

(10) 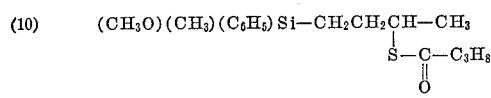

is dissolved in 700 parts methanol. A quantity of 31 parts of methyl amine is added to the reaction vessel which is then stirred and heated to reflux. Upon formation of a precipitate, representing the amide by-product, the reaction mixture is cooled and filtered to remove the precipitate. About 60% of the methanol is distilled off after which a further precipitate of the amide forms and the reaction mixture is again cooled, filtered, and further methanol distilled from the mixture. After the final methanol is removed, the remaining reaction product is cooled, filtered, and fractionally distilled to yield the product having the structure:

(12) 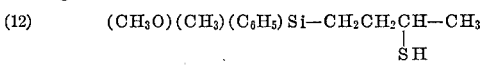

A process has thus been shown for producing mercaptoalkyl substituted monomeric organosilicon compounds having, if desired, functional substituents, including silicon hydride groups. These monomeric organosilicon compounds can be reacted, through methods well known in the art, to form organopolysiloxanes with these mercaptoalkyl substituents. Such polysiloxanes are useful, for example, as metal protectants as disclosed in U.S. Pat. No. 3,346,405 of R. V. Viventi, assigned to the same assignee as the present invention.

I claim:
1. A process for producing mercaptoalkyl substituted monomeric organosilicon compounds having a formula selected from the class consisting of:

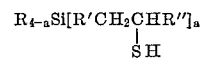

and

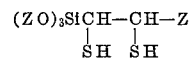

comprising reacting the corresponding alkyl thioacid salt-substituted organosilicon compound with a member selected from the class consisting of ammonia and primary and secondary amines, where R is a group selected from the class consisting of alkyl, aryl, aralkyl, alkaryl, OZ, amine, and aminoxy; R' is a divalent, saturated alkylene group; R" is selected from the class consisting of monovalent alkyl groups and hydrogen, where the total number of carbon atoms in R' and R", combined, is from 0 to 20; Z is selected from the class consisting of lower alkyl and phenyl; and $a$ is from 1 to 2.

2. The process of claim 1 wherein the reaction is carried out in the presence of an alkanol and at a temperature corresponding to the reflux temperature of the mixture.

3. The process of claim 1 wherein Z is an alkyl group of from 1 to 3 carbon atoms.

4. A process for forming:

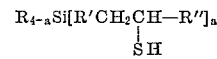

comprising reacting:

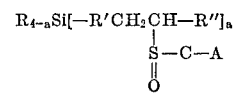

with

where R is a group selected from the class consisting of alkyl, aryl, aralkyl, alkaryl, OZ, amine, and aminoxy; R' is a divalent, saturated alkylene group; R" is selected from the class consisting of monovalent, saturated alkyl groups and hydrogen, where the total number of carbon atoms in R' and R", combined, is from 0 to 20; Z is selected from the class consisting of lower alkyl and phenyl; R''' is selected from the class consisting of lower alkyl, phenyl, and hydrogen; A is a hydrocarbon group of up to 15 carbon atoms; and $a$ is from 1 to 2.

5. The process of claim 4 wherein the reaction is carried out in the presence of an alkanol and the reaction mixture is heated at a temperature corresponding to the reflux temperature of the reaction mixture.

6. A process for forming:

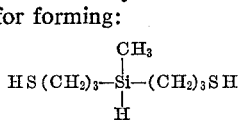

comprising reacting:

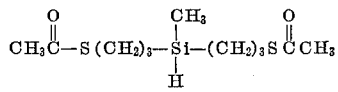

with ammonia in the presence of ethanol and at the reflux temperature of the reaction mixture.

7. A process for forming a mercaptoalkyl substituted monomeric organisilicon compound of formula:

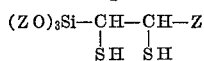

comprising reacting an organosilicon compound of formula:

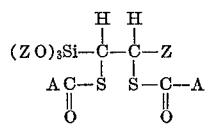

with a material having the formula:

where R''' is selected from the class consisting of lower alkyl, phenyl, and hydrogen; Z is selected from the class consisting of lower alkyl and phenyl; and A is a hydrocarbon radical of up to 15 carbon atoms.

8. A process for forming:

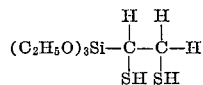

comprising reacting:

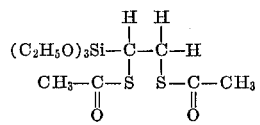

with ammonia in the presence of ethanol and at a temperature corresponding to the reflux temperature of the reaction mixture.

References Cited
UNITED STATES PATENTS

| | | | |
|---|---|---|---|
| 3,078,292 | 2/1963 | Prober | 260—448.2 |
| 3,392,182 | 7/1968 | Koerner | 260—448.8 |
| 3,370,076 | 2/1968 | Niederprum | 260—448.2 |

TOBIAS E. LEVOW, Primary Examiner

W. F. W. BELLAMY, Assistant Examiner

U.S. Cl. X.R.

260—448.8, 448.2